United States Patent [19]

Staples et al.

[11] Patent Number: 4,755,994
[45] Date of Patent: Jul. 5, 1988

[54] CAPACITY EXPANDER FOR TELEPHONE LINE

[75] Inventors: Lester H. Staples, Richfield; James M. Kresse, Burnsville, both of Minn.

[73] Assignee: Republic Telcom Systems Corporation, Boulder, Colo.

[21] Appl. No.: 773,358

[22] Filed: Sep. 6, 1985

[51] Int. Cl.⁴ .................. H04J 15/00; H04B 1/06
[52] U.S. Cl. .................................. 370/118; 375/122; 381/29
[58] Field of Search .................. 370/69.1, 71, 72, 118, 370/81; 375/122; 179/2 R, 2 DP; 381/29, 30, 31

[56] References Cited

U.S. PATENT DOCUMENTS

| | | | |
|---|---|---|---|
| 4,058,676 | 11/1977 | Wilkes et al. | 381/29 |
| 4,110,560 | 8/1978 | Leary et al. | 375/122 |
| 4,270,025 | 5/1981 | Alsup et al. | 381/31 |
| 4,375,013 | 2/1983 | Cointot et al. | 375/122 |
| 4,379,949 | 4/1983 | Chen et al. | 375/122 |
| 4,381,428 | 4/1983 | Kolesar et al. | 375/122 |

FOREIGN PATENT DOCUMENTS 8400848  5/1984  PCT Int'l Appl. .
8401315  8/1984  PCT Int'l Appl. .

OTHER PUBLICATIONS

Article entitled "A Programmable Voice Digitizer Using the T.I. TMS-320 Microcomputer", by Daniel F. Daly and L. E. Bergeron, from *Proceedings, IEEE* 1983 Acoustics Speech & Signal Processing, vol. 2.

Primary Examiner—Douglas W. Olms
Assistant Examiner—Frank M. Scutch, III
Attorney, Agent, or Firm—Dorsey & Whitney

[57] ABSTRACT

A private telephone line expander is disclosed which receives two analog voice inputs. Both input signals are digitized, compressed using full period splicing, and converted back to analog for transmission. One is shifted to the upper half of the telephone line bandwidth. The other remains in the lower half. Both are transmitted on the same telephone line. When received both signals are expanded to normal telephone bandwidth and can be connected to two different telephones. DTMF signals are transmitted with each voice transmission.

12 Claims, 6 Drawing Sheets

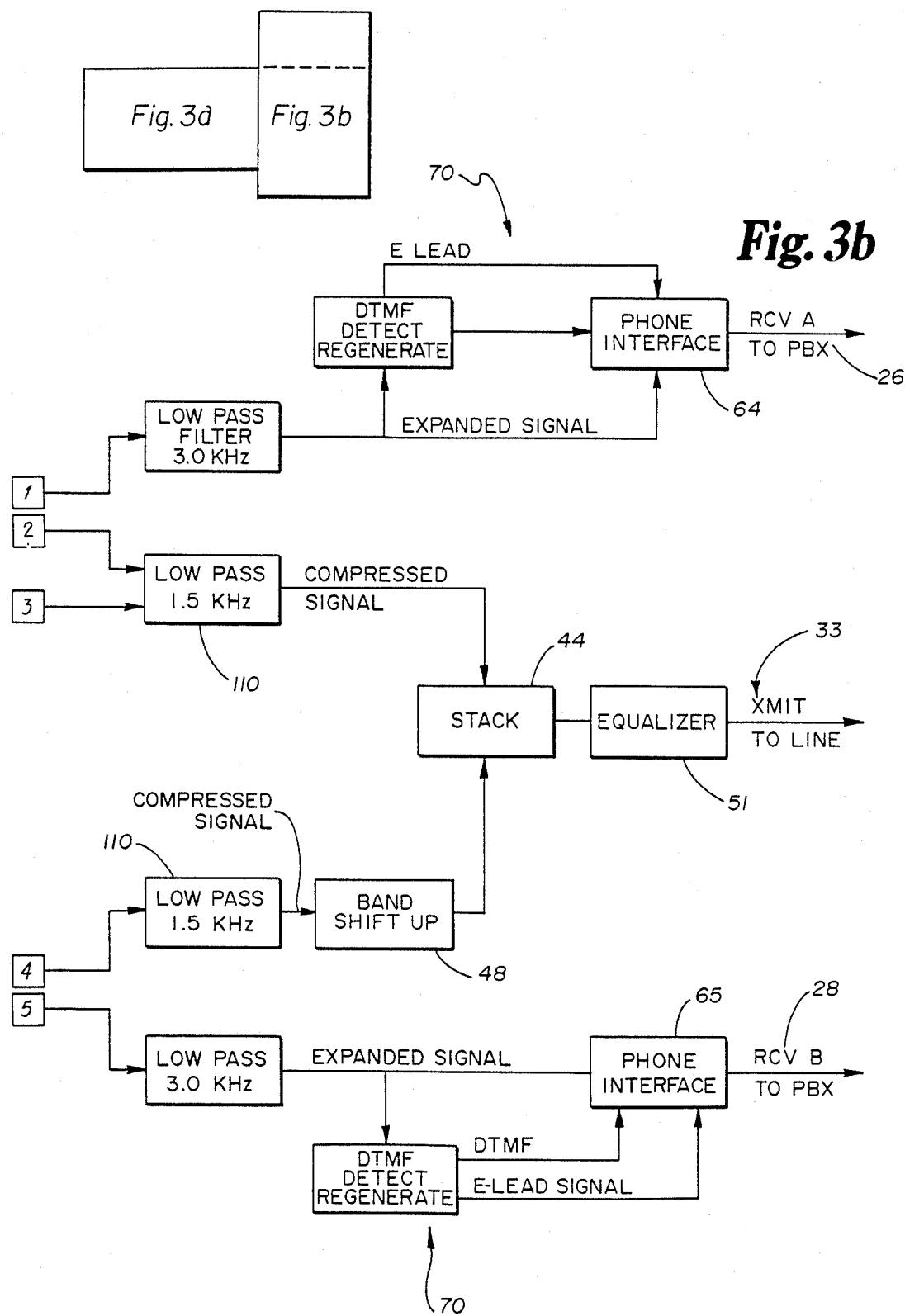

CAPACITY EXPANDER FOR TELEPHONE LINE

BACKGROUND OF THE INVENTION

This invention relates to a communication system for transmitting and receiving information over a telephone line or the like. More specifically, the invention relates to a device which expands the capacity of the line by permitting the simultaneous transmission of two or more voice conversations over the same telephone line or similar voice grade circuits.

The invention is an improvement over voice signal processing such as those disclosed in PCT Patent Application No. PCT/US84/00848, published Dec. 20, 1984 under International Publication No. WO84/04989 and PCT Patent Application No. PCT/US84/01315, published on Feb. 28, 1985 under International Publication No. WO85/00944.

The first patent application identified above discloses an apparatus for selecting and discarding or duplicating alternate pitch periods of an analog voice signal.

A peak detector is used to identify glottal pulses in the analog voice signal. The periodicity of the glottal pulses is used to determine jump intervals in a microprocessor controlled system which stores successive samples of the analog voice signal. By using this method and apparatus alternate pitch periods can be selected to create a compressed version of the speech signal. Similarly, the speech signal can be expanded by using jump logic to duplicate successive speech intervals or glottal epochs received.

The second patent referenced above, discloses a method of stacking compressed analog speech signals and related communication signals so that two speech signals can be transmitted on the same telephone line. As shown in the figures to that patent, particularly FIGS. 3 and 4, stacking is achieved with intermediate frequency techniques by modulating one of the two analog voice signals with a 455 kilohertz carrier and then demodulating it with a 451.8 kilohertz carrier prior to transmission. A similar process is utilized at the receiving end of the telephone line after which the signal is expanded for normal audio processing.

SUMMARY OF THE INVENTION

Applicants have devised numerous improvements to the above captioned inventions using microprocessor based technology which greatly enhances the operation and performance of the inventions identified above. Rather than attempting to measure periodicity of speech intervals with an electronic peak detector detecting glottal pulses, applicants have devised an autocorrelation scheme, software based, which accurately detects pitch periods for purposes of speech compression and expansion. Applicants further, when combining pitch periods for purposes of compression and when duplicating pitch periods for purposes of expansion, employ software techniques to achieve full period splicing. Therefore, speech when transmitted and when reconstructed for purposes of expansion flows smoothly from pitch period to pitch period without anomolies which occur in methods using less than full period splicing.

Stacking of two or more speech signals is also accomplished at a substantially reduced cost by stacking at audio frequencies rather than at intermediate frequencies as suggested by the prior art. Consequently, audio filters and techniques can be utilized rather than the more expensive requirements and techniques required at intermediate frequency ranges.

With the invention two or more simultaneous voice calls can be made on each private telephone line. The result is an increase in the capacity of the line or a reduction in the cost of telephone lines. The unit works with any existing private telephone line and is cost effective on small trunk groups and on short distance private lines.

Today, over half the private lines in the United States are in groups of ten or less and under a hundred miles in distance. Thus the invention is cost effective for applications requiring more than one private line and relatively short distances. Future capacity can be added, one line at a time as it is needed. Because of its versatility, the invention is appropriate for tail circuits, small trunk groups to branch facilities or FX/OPX applications.

Since two simultaneous voice conversations share the bandwidth of a single analog private line, the monthly rental or lease costs for private line voice networks is reduced. The increase in private line capacity includes point-to-point tie lines, automatic ring down circuits, foreign exchange (FX) lines and permits an owner to resell excess private line capacity.

The compactness of the unit permits it to be installed as a table top unit or rack mounted in a standard equipment rack.

Both originating side and receiving side connections support E and M lead signalling.

A unique conversion process takes the incoming analog speech signal of normal bandwidth and transmits a processed analog signal, which occupies approximately one-half of the bandwidth of the original speech, and yet contains the information necessary for a receiving unit at the far end to reproduce the original analog speech signal with only moderate degradation. A digital speech processor analyzes the speech and removes the repetitive patterns inherent and frequent in human speech. The resulting representation of speech for each channel is then transmitted using one half of the bandwidth of an analog line. At the receiving end, a reverse process takes place as the received speech signals are synthesized into their original form and connected to two or more standard three kilohertz analog telephone lines.

DESCRIPTION OF THE DRAWINGS

FIG. 3 3a, and 3b are a basic block diagram of the components which make up the private line expander.

DESCRIPTION OF THE PREFERRED EMBODIMENT

The invention is a private line expander 12 which allows a plurality of simultaneous voice conversations to share the bandwidth of a simple analog private line, thus reducing monthly costs for private-line voice networks. For ease of explanation the Description of the Preferred Embodiment will disclose the invention for simultaneously transmitting two voice conversations on a single private line. It will be obvious to those skilled in the art that with appropriate modifications made to the sampling frequencies and to the stacking frequencies that more than two conversations can be similarly processed for transmission.

Applications in which the increase in private line capacity is advantageous include point-to-point tie lines, automatic ring-down circuits, Foreign Exchange (FX) lines and resale of excess private line capacity. Benefits achieved with the invention include the ability of transmitting simultaneous voice calls over a single private line, a reaction of monthly private line costs, and a reduction in time required to obtain additional private lines. The invention works with all existing analog private voice networks. It is cost effective on small trunked groups and on short distance private lines. It is a rapid and inexpensive re-configuration which is expandable on a per-line basis.

Both channel-side and facility-side connections to the invention are preferably analog four-wire E and M connections. Channel-side options include two wire and four wire SF. The invention utilizes a multiplexing scheme based on digital speech processing and time domain harmonic scaling.

Using the invention incoming analog speech 16, 18 is converted to digital form. A unique conversion process takes the incoming analog speech signal of normal bandwidth and transmits a processed analog signal, which occupies approximately one-half of the bandwidth of the original speech, and yet contains the information necessary for a receiving unit at the far end to reproduce the original analog speech signal with only moderate degradation. A digital speech processor 20 analyzes the speech and blends repetitive patterns inherent and frequent in human speech. The resulting representation of speech for each channel is then transmitted using one half of the bandwidth of an analog line. At the far end or receiving end the reverse process takes place, as the received speech signals are synthesized into their original form and the resulting output 26,28 is connected to two standard three kilohertz analog outputs.

Referring to the figures, operation of the invention can be understood.

Figure 1:
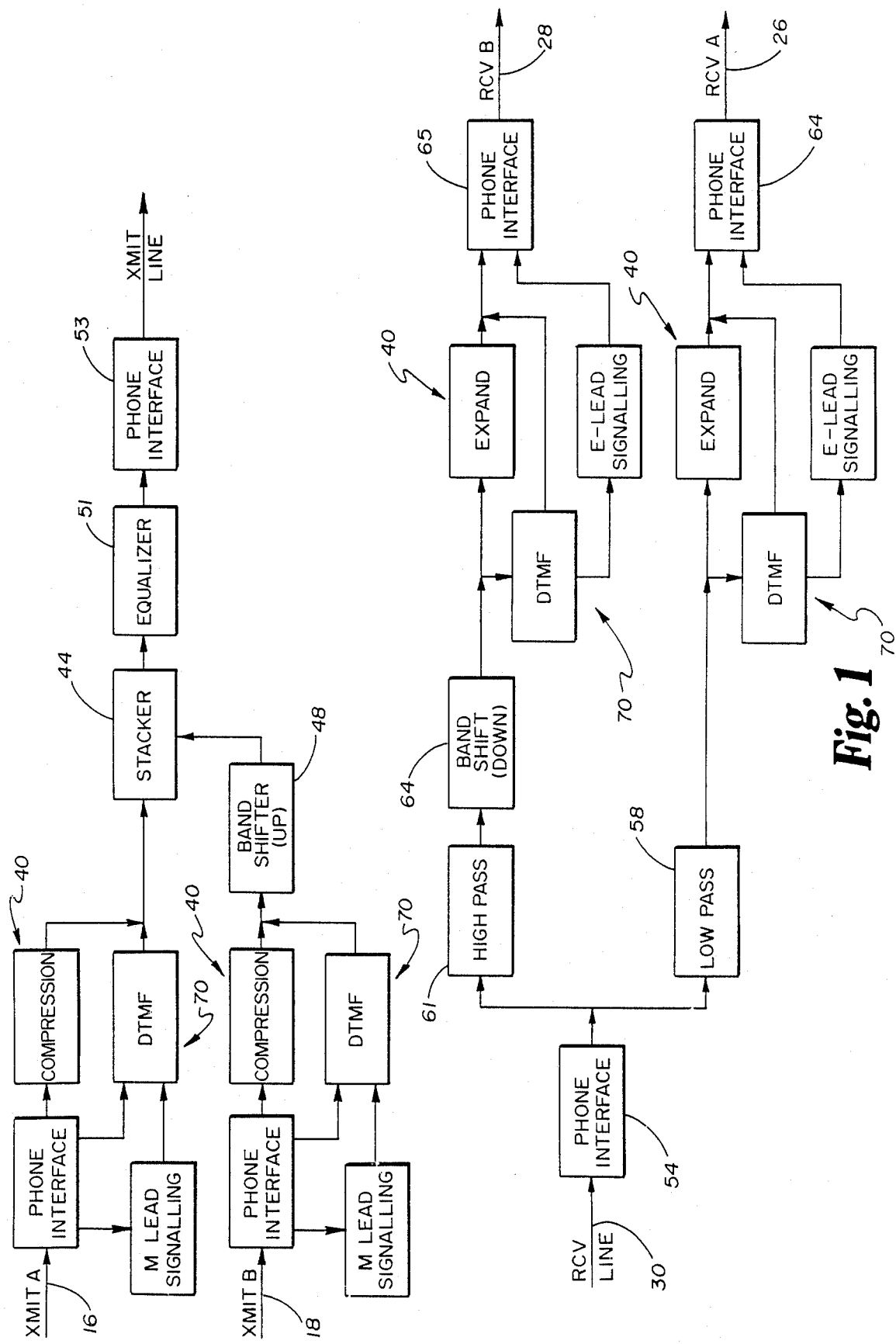
FIG. 1 is a basic block diagram of the signal flow through the private line expander.

The basic block diagram of the signal flow of the invention is shown in FIG. 1 which receives inputs 16,18 from each of two handsets through a PBX and also receives one input telephone line 30 which can carry two or more simultaneous telephone conversations. Similarly, the output of the line expander 12 is two separate analog outputs 26,28 to the PBX both of which outputs 26,28 are derived from the single line input 30 to the expander 12 and one output 33 to the telephone line which contains both channel A and channel B inputs in compressed form. Shown in FIG. 2 is the expansion/compression engine and shown in FIG. 3 is a basic block diagram of the circuit elements which achieve the processing shown in FIG. 1.

FIG. 1 shows how two telephone conversations 16,18 are transmitted and received simultaneously on a single telephone line 33.

Figure 2:
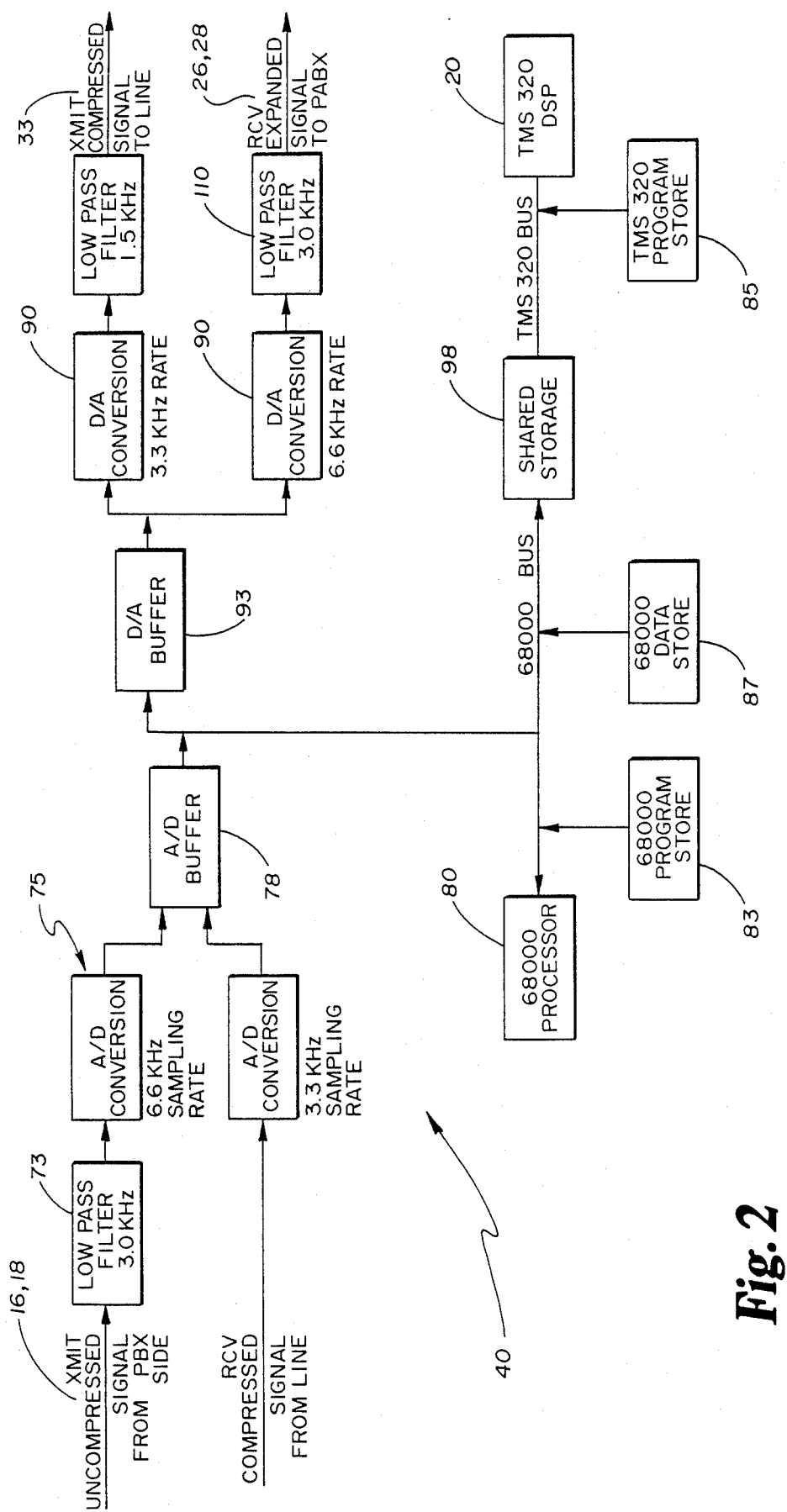
FIG. 2 is a block diagram of the expansion/compression engine.

As shown in FIG. 1, the first channel 16 is compressed using a multiprocessor section 40 configured to function as a expansion/compression engine as shown in FIG. 2 and is connected to a stacker 44 to transmit the signal in the frequency range of 200 hertz to 1500 hertz. The second channel 18 is compressed and then modulated with a fixed audio frequency of 3.38 kilohertz in a bandshifter 48 to create upper and lower sidebands. The carrier frequency and the upper sideband are filtered off and the resulting lower sideband is connected to the stacker 44 to transmit at frequencies of 1800 hertz to 3200 hertz. The frequency response of the two simultaneously transmitted analog signals over the passband of 200 hertz to 3.1 kilohertz are equalized with an equalizer 51 and connected to a telephone interface 53 to transmit simultaneously on the telephone line 33.

The received signal flow, also shown in FIG. 1, is similar. The two simultaneously transmitted analog signals are received on the line 30 through a phone interface 54 and the first channel is passed through a low pass filter 58 which passes frequencies below 1500 hertz and the second channel is passed through a band-pass filter 61 which passes frequencies above 1800 hertz and below 3200 hertz. The high channel is demodulated with a band shifter 64 to recover the upper sideband in the 200 hertz to 1500 hertz range and the resulting signals are expanded with a processor section 40 which detects pitch periods by autocorrelation of samples obtained at a 3.3 kilohertz sampling rate and duplicates successive speech intervals by full period splicing to produce data to be read at a 6.6 kilohertz sampling rate to synthesize the original four hundred to 3000 hertz analog signals. Both of these signals 26,28 are connected to the phone interface 64,65 of the respective handsets to which they are directed. Using modulation at audio frequencies eliminates the extra demodulating requirement set forth in the prior patent applications discussed and enables the use of audio technology to reduce the cost of the apparatus.

Figure 3A:
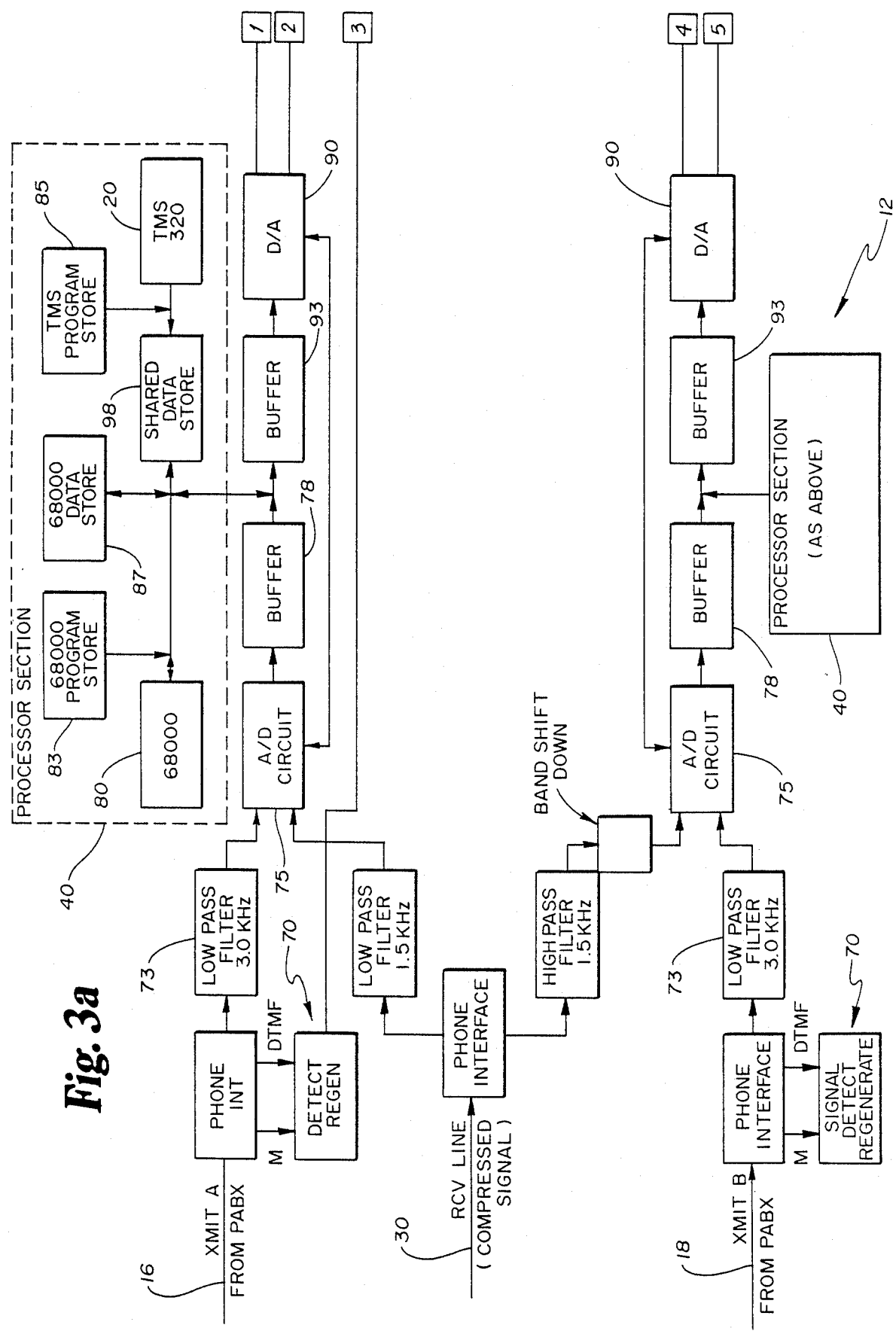

Referring to the overall block diagram of the system as shown in FIG. 3, i.e. FIGS. 3a and 3b. Three inputs to the private line expander are labeled "transmit A" 16 which originates from the microphone in a first telephone handset. "Transmit B" 18 originates from the microphone in a second telephone handset and the receive line 30 is the compressed signal having two simultaneous conversations in compressed form which is received from the telephone line. The system output, shown on the right hand side of FIG. 3, is a signal "receive A" 26 which is connected to the speaker in the first telephone handset, "transmit line" 33 which is the two conversations "transmit A" and "transmit B" in compressed form which are transmitted on the line and "receive B" 28 which is connected to the speaker in the second telephone handset. Each of these six signals are passed through bandpass filters and are sequentially processed with a multiplexer/demultiplexer (not shown).

A shown in FIGS. 1 and 3, the analog voice signal from each of the channel A and channel B handsets are digitized, compressed and transmitted on a single line 33. M & E lead signalling, other control and supervisory signals or tones A, B, C and D and DTMF signals for dialing purposes are bypassed and processed separately with detector and regeneration circuitry 70 as shown in connection with FIG. 5. The ability to achieve DTMF dialing will be discussed in connection with FIG. 5.

As shown in FIGS. 2 and 3, the uncompressed signals 16,18 to be transmitted are passed through a low-pass filter 73 and into an analog-to-digital conversion circuit 75 with digital samples being taken at a 6.6 kilohertz sampling rate. The digital values are stored in an analog-to-digital data buffer 78 which stores the digital values. These values are processed with a general purpose microprocessor 80, for example a Motorola 68000, and with the digital signal processor 20, for example a TMS 32010 manufactured by Texas Instruments.

The TMS 320 digital signal processor 20 performs the autocorrelation to determine pitch periods, to be described below, and utilizes the pitch periods to process the received data and to perform full period splices. As shown in the drawings, ROM chips 83,85 are used for the 68000 microprocessor program and the TMS 320 program. Additional RAM memory 87 is used for data generated by the 68000 microprocessor 80 and dual ported shared storage 98 is available for the TMS 320 and the 68000 to share data.

Analog to digital operations with the system use a successive approximation register chip. Each analog-to-digital conversion requires a number of iterative passes to generate a digital value to be stored in the A to D buffer 78. Although shown separately in the drawings the digital-to-analog circuit 75,78 is functionally part of the analog-to-digital system 90,93 and the use of these elements for their respective operations is performed at different clock times to avoid mutual interference.

Pitch detection is achieved with the digital speech processor 20 which performs autocorrelation. The digital speech processor takes a block of speech of a given sample length or memory depth, for example, 140 samples.

Each sample is then cross correlated with every other sample within a selected pitch range to automatically determine the best correlation and therefore the pitch of the speech intervals.

This is achieved as follows. For a pitch range of, for example, twenty to eighty samples, the first sample is multiplied by the twenty-first sample; the second by the twenty-second and so on until the sixtieth sample is multiplied by the eightieth. These products are summed and stored. Then the first sample is multiplied by the twenty-second sample, the second by the twenty-third, and so on and again summed and stored. Successive samples are processed until the first is multiplied by the eighty-first sample, etcetera, and the sixtieth sample is multiplied by the one hundred fortieth sample and the products are summed and stored.

The largest sum represents the pitch period of the voice intervals sampled. It will be the product of the largest positive transitions added to the product of the largest negative transitions when most closely aligned during the cross correlation.

If the match occurs at 50 samples, then correlation is established and the one hundred samples of speech are blended by the digital speech processor 20 to create 50 data values which are then stored in the digital-to-analog buffer 90. Since only half the data is present, the digital-to-analog conversion can take place at a 3.3 kilohertz rate as shown in FIG. 2 which compresses the data for transmission. The pitch period data is then stored in memory for use to accomplish full period splicing. Autocorrelation continues, however, by the digital speech processor 20 with an additional block of speech starting at the 101st sample for the next 140 samples or similarly selected data block selected for processing.

The TMS 320 digital speech processor 20 also performs full period splices to compress successive periods for purposes of transmission.

Figure 4A:
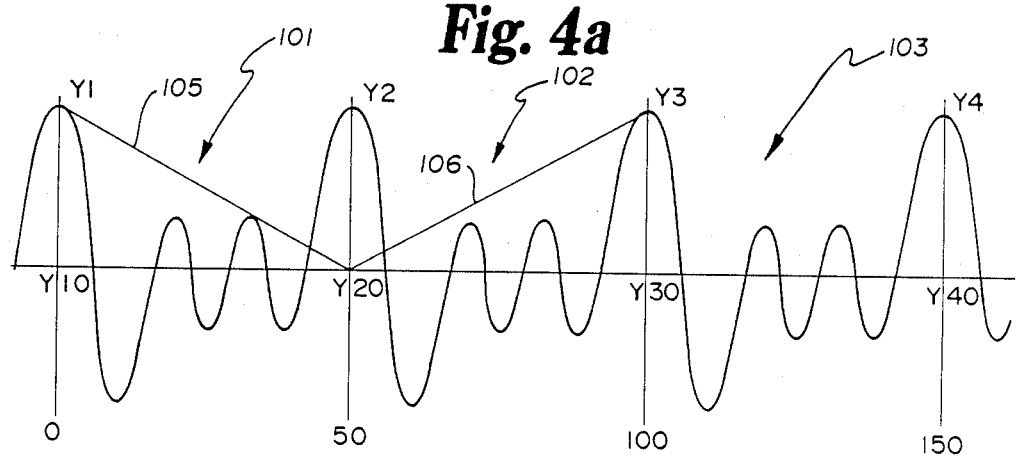
FIG. 4, consisting of FIGS. 4a through 4c, is a sketch of speech signals demonstrating the full splice algorithms for successive speech intervals in FIG. 4a and resulting in the signal for transmission of compressed speech intervals as shown in FIG. 4b.
FIG. 4c represents the splicing algorithm used for speech expansion.
Figure 4B:
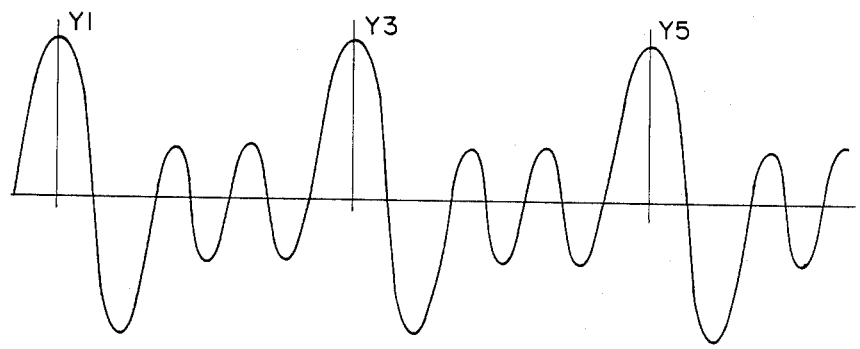

As shown in FIG. 4, each of two pitch periods, those matched by autocorrelation, are blended so that the full ending value of each of the alternate speech periods corresponds to the value at the end of the period detected by the autocorrelation routine.

Shown in FIG. 4a are three successive speech intervals, 101,102,103 each representing fifty samples of sampled speech at the 6.6 kilohertz rate. The full period splice is achieved by taking successive portions of each speech interval 101,102 using the linear proportions indicated by the lines 105,106 superimposed on the speech intervals. In other words, the first data value will be 100% of the value of the first interval, Y1, and 0% of the value of the second interval, Y2; the second will be 98% of the magnitude of the first interval 101 and 2% of the second 102. The final value will be 0% of the first speech interval 101 and 100% of the second, 102, Y3. The resulting data as stored in the digital-to-analog buffer 90 is fifty data samples which smoothly transcends from the magnitude of the beginning of the first speech interval 101 to the beginning of the third speech 103 interval and similarly for each speech interval to be transmitted at the 3.3 kilohertz rate. Therefore, there is a perfect correlation between the end of the first reconstructed pitch period and the beginning of the next pitch period to be transmitted.

It should be understood that the illustrations of FIG. 4, speech intervals beginning and ending at peak values, is for purposes of illustration and explanation. The correlation is accurate and processing is accurately accomplished regardless of where peak values occur in the speech interval(s) sampled.

The read out of data from the digital-to-analog buffer 90 is at a 3.3 kilohertz rate, therefore, compressing the bandwidth of the information to a 1.5 kilohertz bandwidth which is then passed through a filter 110 and connected with the second channel information which is shifted up in frequency on the same telephone line for simultaneous transmission.

After digital processing of the channel A voice signal and the channel B voice signal to compress the signals so that they may both be transmitted simultaneously on the line, the signals are stacked with channel A occupying the range 200 hertz to 1.5 kilohertz and channel B occupying the range of 1.8 to 3.1 kilohertz. These signals are transmitted in analog form to the receive line of the receiving line expander. At the receive end the compressed signals are separated and expanded to 400 hertz to 3 kilohertz each to produce the "receive A" and "receive B" signals.

With the differences discussed in connection with FIG. 1, the receive circuitry and software of FIG. 3 operates in substantially the same way as discussed in connection with the transmit circuitry. Each analog signal received is sampled at a 3.3 kilohertz rate. The digital speech processor 20 determines the pitch with autocorrelation. The pitch period is then used to regenerate data for expansion of speech intervals with full period splicing which can be sampled and converted at a 6.6 kilohertz rate. This regenerates the speech at the four hundred hertz to 3 kilohertz bandwidth.

Figure 4C:
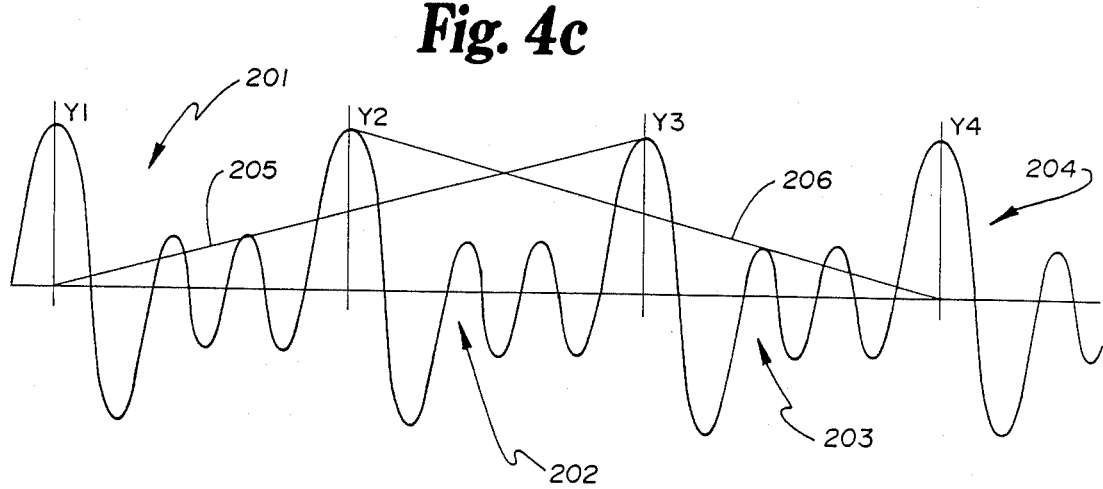

FIG. 4c demonstrates the algorithm for full period splicing of the received signals for expansion. Four intervals 201–204 are represented. To expand the second interval from fifty to one hundred samples or data values necessary for expansion, the one hundred samples from the first two intervals 201,202 are averaged with the one hundred samples from the second two intervals 202,203 using the linear proportions indicated by the lines 205,206 superimposed on the speech intervals 201-203. Similarly the next hundred expanded speech samples are derived from compressed speech intervals 202,203 and 204.

Figure 5:
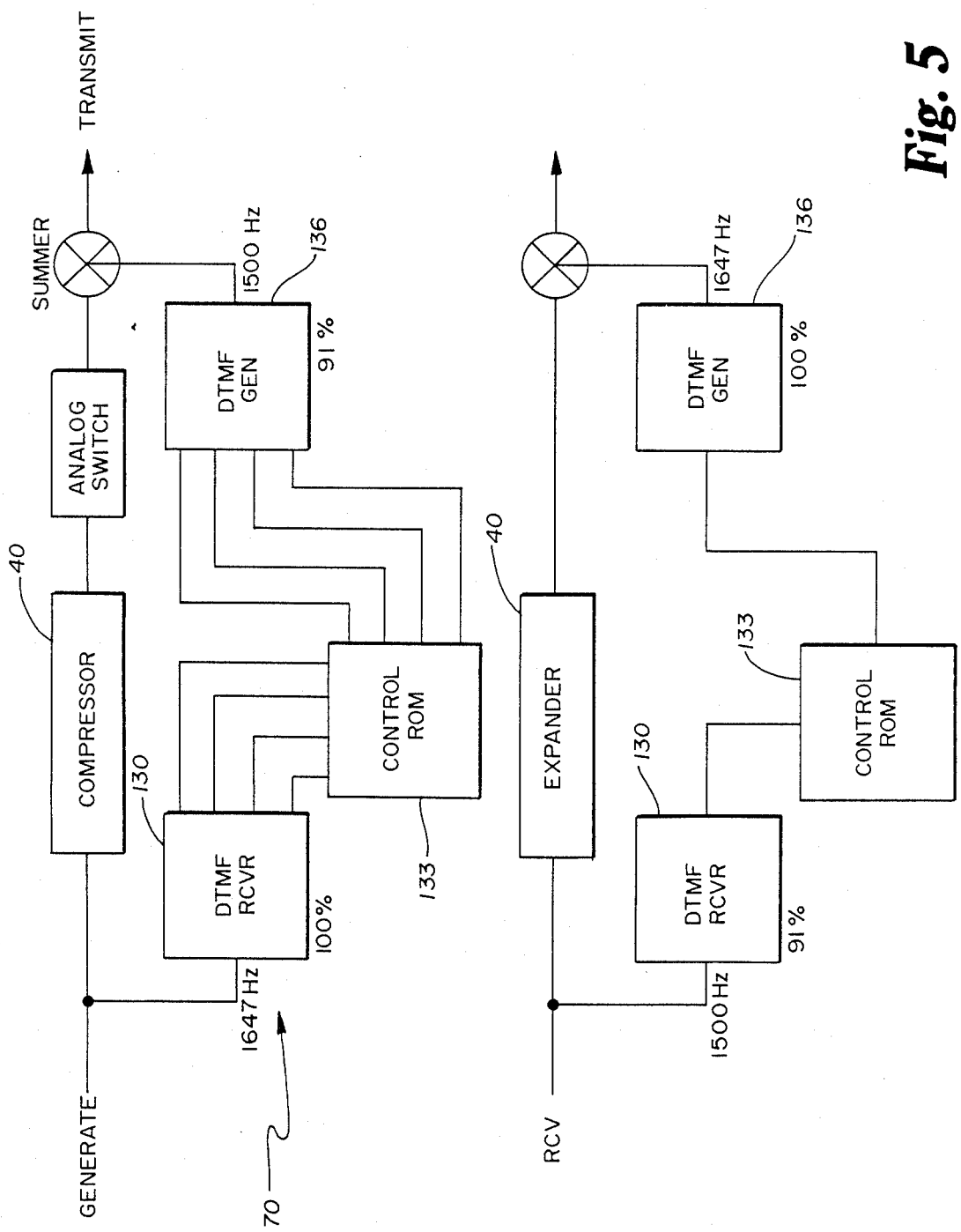
FIG. 5, is a schematic of the dual tone multiple frequency (DTMF) detector and regenerator.

FIG. 5 shows the M and E lead, control signal and DTMF detection and regeneration circuitry 70. Dual tone multifrequency signals when received by the private line expander 12 are connected through a DTMF receiver 130 to a control ROM 133, the output of which is connected to a DTMF generator 136 which is operated at 91% of normal DTMF frequencies. This allows the frequencies to be narrowed to be within either the upper or lower band being transmitted. In other words, the upper tone of 1647 hertz is reduced to below 1500 hertz. On the receive end of the line, the second private line expander 12 receives the DTMF tones at 91% and regenerates the tones at 100%. In addition to DTMF dialing purposes control tones A, B, C and D are also utilized through the tone detector and regenerator. The A tone is used for E & M, E lead and M lead, handshaking. The B, C and D tones can be used for diagnostics.

Various methods of echo control may also be advantageously used with the line expander, 12.

Having described a specific embodiment of our invention it will be obvious to those skilled in the art that various modifications can be made and still achieve the objectives of the invention. Consequently, all such variations and modifications are intended to be within the scope of the appended claims.

Having described our invention, we claim.

1. A line expander for a telephone line comprising:
means for receiving a first analog voice signal;
means for receiving a second analog voice signal;
autocorrelation means for determining the pitch periods of said first and second analog voice signals operably coupled to said means for receiving said analog signals;
voice compression means operably coupled to said autocorrelation means, for compressing said first and second analog voice signals based on their respective pitch periods determined by the autocorrelation means, to form first and second compressed signals having respective bandwidths less than the respective bandwidths of said first and second analog voice signals;
audio frequency shifting means for shifting the second compressed signal to a frequency band above the first compressed signal; and
means for simultaneously transmitting both compressed voice signals on the same telephone line.

2. The line expander of claim 1 wherein the compression means comprises means for splicing successive speech intervals on a proportional basis.

3. The line expander of claim 1 wherein the expander further comprises:
means operably coupled to said transmitting means for reducing the frequency bandwidth of dual tone multiple frequency signals to less than half of the bandwidth of the telephone line.

4. The private line expander of claim 3 wherein the line expander further comprises:
means operably coupled to said transmitting means for reducing the frequency of A, B, C and D tones to less than half of the bandwidth of the telephone line; and
wherein one of the tones is used for M and E lead signalling and at least another of the tones is used for diagnostic purposes.

5. A line expander for a private telephone line comprising:
receiving means for receiving compressed analog voice signals;
autocorrelation means, operably coupled to said receiving means, for determining the pitch of the voice signals; and
means operably coupled to said autocorrelation means for expanding the analog voice signals based on the pitch determined by the autocorrelation so that the signals have a bandwidth of normal audio signals,
said receiving means including means for receiving two or more compressed analog voice signals on the same telephone line.

6. A line expander for a telephone line comprising:
receiving means for receiving at least two compressed analog voice signals on the same telephone line;
filter means, operably coupled to said receiving means, for separating the two compressed voice signals;
first expansion means, operably coupled to said filter means, for expanding the first compressed voice signal to have a bandwidth of normal audio frequencies;
audio frequency shifting means, operably coupled to said filter means for shifting the frequency of the second compressed voice signal to base band frequencies;
second expansion means operably coupled to said audio frequency shifting means for expanding the second voice signal to normal audio frequency; and
first and second phone interface means, respectively coupled to said first and second expansion means, for connecting each of the voice signals to separate telephone lines.

7. The line expander of claims 5, or 6 wherein the means for expanding the analog voice signals comprises means for splicing successive speech intervals on a proportional basis.

8. The line expander of claims 4, or 5 wherein the private line expander further comprises:
means for receiving dual tone multiple frequencies associated with each of the compressed voice signals, each dual tone multiple frequency being less than half the bandwidth of the telephone line; and
means for increasing the frequency of each dual tone multiple frequency received to that normally transmitted on the telephone line.

9. A line expander for a telephone line comprising:
means for receiving at least one analog voice input;
autocorrelation means for determining the pitch period of the analog voice input operably coupled to said means for receiving an analog signal;
voice compression means operably coupled to said autocorrelation means for compressing the analog voice input to form a compressed signal based on the pitch period determined by the autocorrelation means so that the bandwidth of the compressed signal is less than the bandwidth of the analog voice signal;
means operably coupled to said voice compression means for transmitting the compressed signal, said voice compression means including means for splicing successive speech intervals on a variable proportional basis.

10. The line expander of claim 9 wherein the expander further comprises:
   means for receiving a second analog voice signal;
   means for compressing the second voice signal based on the pitch period of the second voice signal as determined by the autocorrelation means to form a second compressed signal having a bandwidth which is less than the bandwidth of the second analog voice signal;
   audio frequency shifting means to shift the second voice signal to a frequency band above the first compressed signal; and
   means for simultaneously transmitting both compressed voice signals on the same telephone line.

11. A line expander for a telephone line comprising:
   means for receiving at least one analog voice input;
   autocorrelation means for determining the pitch period of the analog voice input operably coupled to said means for receiving an analog signal;
   voice compression means operably coupled to said autocorrelation means, for compressing the analog voice input based on the pitch period determined by the autocorrelation means to form a compressed signal so that the bandwidth of the compressed signal is less than the bandwidth of the analog voice signal;
   transmitting means operably coupled to said voice compression means for transmitting the compressed signal; and
   means operably connected to said transmitting means for reducing the frequency of dual tone multiple frequency signals to less than half of the bandwidth of the telephone line.

12. The private line expander of claim 11 wherein the line expander further comprises:
   means operably coupled to said transmitting means for reducing the frequency of A, B, C and D tones to less than half of the bandwidth of the telephone line; and
   wherein one of the tones is used for M and E lead signaling and at least another of the tones is used for diagnostic purposes.

* * * * *